(12) United States Patent
Bang

(10) Patent No.: US 12,139,139 B2
(45) Date of Patent: Nov. 12, 2024

(54) VEHICLE AND CONTROL METHOD THEREOF

(71) Applicants: Hyundai Motor Company, Seoul (KR); Kia Corporation, Seoul (KR)

(72) Inventor: Kyung-Joo Bang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 330 days.

(21) Appl. No.: 17/502,414

(22) Filed: Oct. 15, 2021

(65) Prior Publication Data

US 2022/0194373 A1   Jun. 23, 2022

(30) Foreign Application Priority Data

Dec. 23, 2020 (KR) .................. 10-2020-0182233

(51) Int. Cl.
  *B60W 30/16* (2020.01)

(52) U.S. Cl.
  CPC ....... *B60W 30/16* (2013.01); *B60W 2420/403* (2013.01); *B60W 2420/408* (2024.01); *B60W 2520/105* (2013.01); *B60W 2552/15* (2020.02); *B60W 2554/802* (2020.02); *B60W 2554/804* (2020.02); *B60W 2720/106* (2013.01)

(58) Field of Classification Search
  CPC .......... B60W 30/16; B60W 2554/804; B60W 2552/15; B60W 2554/802; B60W 2420/42; B60W 2420/52; B60W 2520/105; B60W 2720/106
  See application file for complete search history.

(56) References Cited

U.S. PATENT DOCUMENTS

| 5,495,251 | A | 2/1996 | Gilling et al. | |
|---|---|---|---|---|
| 2009/0018744 | A1* | 1/2009 | Abe ...................... | B60W 30/16 701/93 |
| 2015/0094927 | A1* | 4/2015 | Takahashi .......... | B60W 30/143 701/93 |

(Continued)

FOREIGN PATENT DOCUMENTS

| CN | 102826092 A | * | 12/2012 | ............ B60W 10/06 |
|---|---|---|---|---|
| JP | 2009286185 A | * | 12/2009 | ............. Y02T 90/16 |
| KR | 100916259 B1 | * | 9/2009 | .......... B60W 40/107 |

OTHER PUBLICATIONS

KR100916259B1_Lee_09-2009.pdf (Year: 2009).*
JP2009286185A_Taguchi_12-2009.pdf (Year: 2009).*
CN102826092A_Ham_12-2012.pdf (Year: 2012).*

*Primary Examiner* — Jelani A Smith
*Assistant Examiner* — Davin Seol
(74) *Attorney, Agent, or Firm* — SLATER MATSIL, LLP

(57) ABSTRACT

An embodiment vehicle includes a sensor configured to measure a current acceleration of the vehicle and a controller configured to derive a target acceleration value based on a surrounding environment of the vehicle, derive a first acceleration value based on an acceleration performance of the vehicle, determine a second acceleration value based on a predetermined limit value and the first acceleration value, determine a final target acceleration value based on the target acceleration value and the second acceleration value, and cause the current acceleration of the vehicle to be changed based on the final target acceleration value.

19 Claims, 7 Drawing Sheets

(56) References Cited

U.S. PATENT DOCUMENTS

| | | | |
|---|---|---|---|
| 2015/0232092 A1* | 8/2015 | Fairgrieve | B60W 30/18172 |
| | | | 701/93 |
| 2017/0183013 A1* | 6/2017 | Matsumoto | B60W 30/16 |
| 2019/0118826 A1* | 4/2019 | Park | B60W 50/082 |
| 2020/0309042 A1* | 10/2020 | Otsubo | B60W 50/10 |
| 2021/0284112 A1* | 9/2021 | Mizoo | B60T 8/17616 |
| 2023/0011130 A1* | 1/2023 | Fukasawa | B60W 30/16 |

* cited by examiner

VEHICLE AND CONTROL METHOD THEREOF

CROSS-REFERENCE TO RELATED APPLICATIONS

This application claims the benefit of Korean Patent Application No. 10-2020-0182233, filed on Dec. 23, 2020, which application is hereby incorporated herein by reference.

TECHNICAL FIELD

The disclosure relates to a vehicle and a control method thereof.

BACKGROUND

Even in the same vehicle, an acceleration performance of the vehicle changes depending on a driving environment such as a load capacity and a road environment. In a case where an acceleration capability of a vehicle is sufficient, the vehicle may sufficiently accelerate even when a target acceleration is rapidly increased, and thus a difference between the target acceleration and a vehicle acceleration is small, so that an engine control output of an acceleration controller for controlling the vehicle acceleration to the target acceleration may be gradually increased, while in a case where the acceleration capability of the vehicle is insufficient, the difference between the target acceleration and the vehicle acceleration is large, so that the engine control output of the acceleration controller is rapidly increased, which causes problems in fuel efficiency and ride comfort. Accordingly, in order to solve these problems, research on acceleration control methods in consideration of an acceleration performance of a vehicle is being actively conducted.

SUMMARY

The disclosure relates to a vehicle and a control method thereof. Particular embodiments relate to a vehicle capable of determining a final target acceleration value of the vehicle and a control method thereof.

An embodiment of the disclosure provides a vehicle capable of deriving a final target acceleration value in consideration of a surrounding environment of the vehicle and an acceleration performance of the vehicle, and a control method thereof.

Additional embodiment of the disclosure will be set forth in part in the description which follows and, in part, will be obvious from the description, or may be learned by practice of the disclosure.

In accordance with an embodiment of the disclosure, a vehicle includes a sensor unit provided to measure a current acceleration of the vehicle, and a controller provided to derive a target acceleration value based on a surrounding environment of the vehicle, derive a first acceleration value based on an acceleration performance of the vehicle, determine a second acceleration value based on a predetermined limit value and the first acceleration value, determine a final target acceleration value based on the target acceleration value and the second acceleration value, and change the current acceleration of the vehicle based on the final target acceleration value.

The controller may determine the target acceleration value based on the surrounding environment of the vehicle including at least one of a distance between the vehicle and an object in front of the vehicle and a relative speed with the object in front of the vehicle.

The controller may derive the first acceleration by adding a weight to an acceleration of the vehicle based on the acceleration performance of the vehicle.

The controller may compare the predetermined limit value with the first acceleration value and determine the larger of the two values as the second acceleration value.

The controller may compare the target acceleration value with the second acceleration value and determine the smaller of the two values as the final target acceleration value.

The controller may determine the predetermined limit value to be larger than a first predetermined output limit value when the vehicle is on an uphill road.

In accordance with an embodiment of the disclosure, a control method of a vehicle includes measuring a current acceleration of the vehicle, deriving a target acceleration value based on a surrounding environment of the vehicle, deriving a first acceleration value based on an acceleration performance of the vehicle, determining a second acceleration value based on a predetermined limit value and the first acceleration value, determining a final target acceleration value based on the target acceleration value and the second acceleration value, and changing the current acceleration of the vehicle based on the final target acceleration value.

The surrounding environment of the vehicle may include at least one of a distance between the vehicle and an object in front of the vehicle and a relative speed with the object in front of the vehicle.

The deriving of the first acceleration value may include deriving the first acceleration by adding a weight to an acceleration of the vehicle based on the acceleration performance of the vehicle.

The determining of the second acceleration value may include comparing the predetermined limit value with the first acceleration value and determining the larger of the two values as the second acceleration value.

The determining of the final target acceleration value may include comparing the target acceleration value with the second acceleration value and determining the smaller of the two values as the final target acceleration value.

The determining of the predetermined limit value may include determining the predetermined limit value to be larger than a first predetermined output limit value when the vehicle is on an uphill road.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Like reference numbers refer to like elements throughout this specification. This specification does not describe all components of the embodiments, and general contents in the technical field to which the disclosure belongs or overlapping contents between the embodiments will not be described. The terms "portion," "module," "member," and "block" as used herein, may be implemented as software or hardware, and according to embodiments, a plurality of "portions," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

In the present specification, it will also be understood that when an element is referred to as being "on" or "over" another element, it may be directly on the other element or intervening elements may also be present.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the disclosure will be described in detail with reference to the accompanying drawings.

Figure 1:
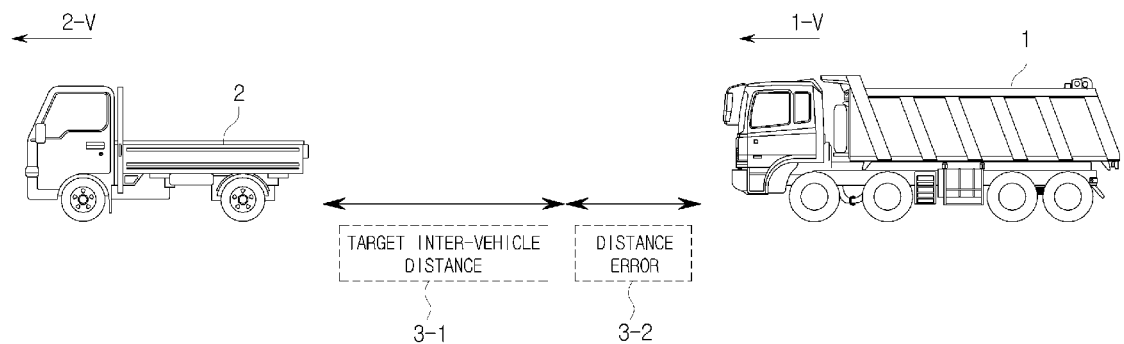
FIG. 1 is a diagram illustrating an operation of determining a target acceleration value in consideration of a surrounding environment of a vehicle according to an embodiment.
Figure 2:
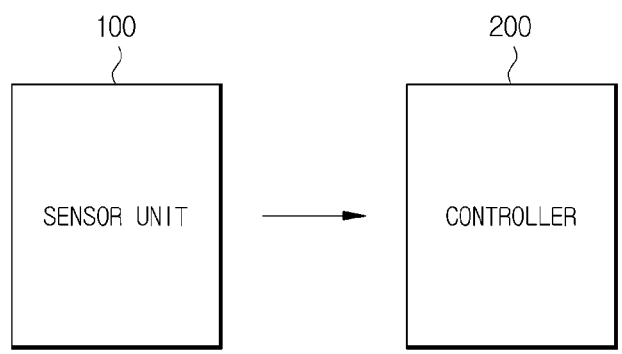
FIG. 2 is a control block diagram of the vehicle according to an embodiment.
Figure 3:
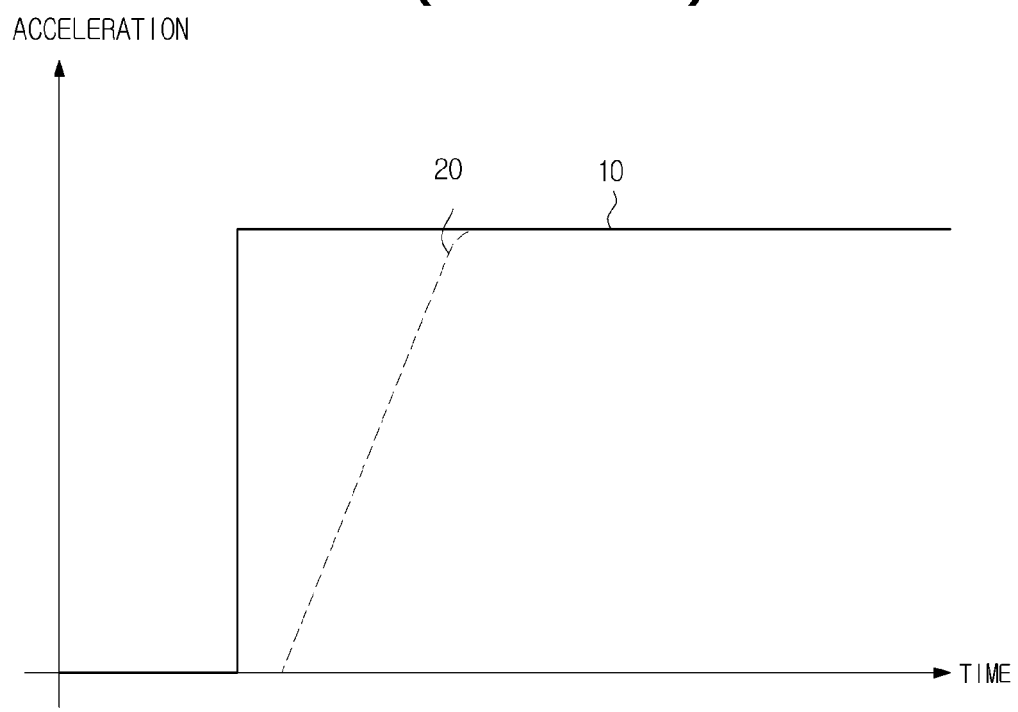
FIG. 3 is a diagram illustrating an operation of a conventional technique for deriving the target acceleration value based on the surrounding environment of the vehicle according to an embodiment.

FIG. 1 is a diagram illustrating an operation of determining a final target acceleration value in consideration of an acceleration of a vehicle 1 and a surrounding environment of the vehicle 1 according to an embodiment, FIG. 2 is a control block diagram of the vehicle 1 according to an embodiment, and FIG. 3 is a diagram illustrating an operation of deriving a target acceleration value 20 based on the surrounding environment of the vehicle 1 according to an embodiment.

Referring to FIGS. 1 to 3, a vehicle 1 according to embodiments of the disclosure may include a sensor unit 100 provided to measure an acceleration of the vehicle 1, and a controller 200 provided to determine the final target acceleration value based on a surrounding environment of the vehicle 1 and an acceleration performance of the vehicle 1. The sensor unit 100 may measure the acceleration of the vehicle 1 and may sense the surrounding environment of the vehicle 1. The sensor unit 100 may include a camera, a radar, a Lidar, a speed sensor, and the like, and the speed sensor may include both a mechanical sensor and an electronic sensor. In addition, the sensor unit may refer to a sensor commonly used to measure the surrounding environment of the vehicle 1 and the acceleration of the vehicle 1. The surrounding environment may refer to a state around the vehicle 1 such as a road environment around the vehicle 1, a distance between the vehicle 1 and an object 2 in front thereof, and a relative speed between the vehicle 1 and the object 2. The acceleration performance of the vehicle 1 may refer to a current acceleration state of the vehicle, and may refer to a maximum acceleration increase rate per unit time or a maximum acceleration decrease rate per unit time when a driving speed of the vehicle is gradually increased or decreased. The acceleration performance may be different depending on a state of the vehicle 1. For example, the acceleration performance when the vehicle 1 is loaded with a load may be lower than that when the vehicle 1 is not loaded with a load. Also, the acceleration performance may vary depending on the state of the vehicle 1. The vehicle 1 may generate a basic target acceleration value 10 based on a driving environment. The basic target acceleration value 10 may refer to an acceleration value that the vehicle 1 ideally reaches within a target time.

As illustrated in FIG. 3, when the driving environment is rapidly changed, the basic target acceleration value 10 may also change sharply. For example, assuming a general case, when the vehicle 1 is controlled to follow the sharply changed basic target acceleration value 10, an error rate, which means a difference between a current acceleration value of the vehicle and the target acceleration, becomes excessive. When the error rate is excessive, acceleration overshooting may occur in a process of controlling the vehicle 1, and fuel economy and riding comfort may deteriorate due to rapid acceleration of the vehicle 1. In order to prevent this problem, the prior art reduces the error rate by using the target acceleration value 20 in which a rate of change of the basic target acceleration value 10 is limited to a predetermined value.

When the target acceleration value 20 is used, an error rate of the current acceleration value of the vehicle and the target acceleration value 20 is smaller than an error rate of the current acceleration value of the vehicle and the basic target acceleration value 10, so that a problem due to an excessive error rate may be prevented. However, even when the target acceleration value 20 with a limited rate of change is used, an error rate between the acceleration value of the vehicle, in a case where the acceleration performance of the vehicle 1 deteriorates due to a load loading and the like, and the target acceleration value 20 becomes larger than the error rate between the current acceleration value of the vehicle and the target acceleration value 20 in a general case, so that the acceleration overshooting may still occur in the process of controlling the vehicle 1, and the fuel economy and riding comfort may deteriorate due to rapid acceleration of the vehicle 1.

In embodiments of the present invention, the controller 200 may derive a final target acceleration value 70 capable of limiting the error rate regardless of the acceleration performance of the vehicle 1. In order to derive the final target acceleration value 70 that limits the error rate, the target acceleration value 20 may be derived based on the surrounding environment of the vehicle 1, and a first acceleration value in which a weight is added to a current acceleration of the vehicle 1 may be derived based on the acceleration performance of the vehicle 1.

The target acceleration value 20 may be obtained by using surrounding information of the vehicle 1 in systems such as ACC and autonomous driving. The first acceleration value refers to a value in which a weight is added to the current acceleration of the vehicle 1 based on the acceleration performance of the vehicle 1 in order to reduce a difference between the target acceleration value and the acceleration value of the vehicle 1. Deriving the first acceleration value based on the acceleration performance may mean that the same weight is added to the current acceleration of the vehicle regardless of the acceleration performance of the vehicle, but the first acceleration value is derived differently.

The weight refers to a value obtained by adding a predetermined acceleration value to the current acceleration of the vehicle in consideration of the error rate. The error rate, which refers to the difference between the target acceleration value and the current acceleration of the vehicle 1, may be reduced by deriving the first acceleration value. The predetermined limit value may refer to a threshold value, and may refer to a minimum value necessary to achieve the purpose when the weight is added to the current acceleration of the vehicle in consideration of the error rate. Also, the controller 200 may compare the predetermined limit value with the first acceleration value and determine the larger of the two values as a second acceleration value. The second acceleration value may refer to the larger of the predetermined limit value and the first acceleration value.

The reason for determining the second acceleration value in which a lower limit value of the first acceleration value is limited by using the predetermined limit value is to prevent the vehicle from being accelerated too late as the target acceleration value 20 is excessively limited by the first acceleration value. For example, when the vehicle enters an uphill road, the current acceleration of the vehicle decreases by a sharp increase in driving resistance due to the uphill slope, and the target acceleration value 20 is increased in order to offset a speed decrease due to this.

In this case, in order to maintain the vehicle speed, the vehicle must reach the target acceleration value 20 to quickly offset the driving resistance caused by the uphill slope. However, when the target acceleration value 20 is excessively limited by the first acceleration value, a time for the vehicle to reach the target acceleration value 20 increases, and eventually the vehicle speed decreases too much on the uphill slope. Assuming that the target acceleration value 20 of the vehicle 1 entering the uphill road is 1 m/s$^2$, the current acceleration value is 2 m/s$^2$, an acceleration change rate of the vehicle in which the target acceleration value 20 is not limited with the first acceleration value is 1 m/s$^3$, and the acceleration change rate of the vehicle in which the target acceleration value 20 is limited by the first acceleration value is 0.25 m/s$^3$, the time for the vehicle to reach the target acceleration value 20 is 3 seconds and 12 seconds, respectively, so that a large difference may be generated. Therefore, in order to reduce this time difference, when the second acceleration value in which the lower limit of the first acceleration value is limited to 0 m/s$^2$ is used, the time for the vehicle to reach the target acceleration value 20 may be reduced to 6 seconds by accelerating the vehicle to 1 m/s$^3$ when the vehicle acceleration is −2 m/s$^2$ to 0 m/s$^2$ and by accelerating the vehicle to 0.25 m/s$^3$ when the vehicle acceleration is −0 m/s$^2$ to m/s$^2$.

The second acceleration value may be determined as the final target acceleration value according to a result of comparison with the target acceleration value 20. The controller 200 may compare the second acceleration value with the target acceleration value 20 and determine the smaller of the two values as the final target acceleration value. Referring to FIG. 1, assuming that the vehicle 1 is currently running at a constant speed 1-V, the object 2 is also running at a constant speed 2-V, and the constant speed 2-V of the object 2 is faster than the constant speed 1-V of the vehicle 1, the vehicle 1 may increase the speed to approach a target inter-vehicle distance 3-1. Before that, there may be a distance error 3-2 in a distance between the vehicle 1 and the object 2, and the vehicle 1 must reach the target inter-vehicle distance 3-1 by reducing the distance error 3-2. In this case, the vehicle 1 may reach the target inter-vehicle distance 3-1 by increasing the speed. At this time, because an engine efficiency may decrease or a shooting phenomenon may occur when the speed of the vehicle 1 is rapidly increased, the final target acceleration value may be determined to appropriately increase the speed of the vehicle. A detailed operation thereof will be described later.

The controller 200 may be implemented as a memory (not shown) for storing an algorithm for controlling the operation of components in the vehicle 1 or data for a program reproducing the algorithm and a processor (not shown) for performing the above-described operations using data stored in the memory. In this case, the memory may be implemented as a separate chip from a processor, or may be implemented as a single chip with the processor.

At least one component is added or deleted according to the performance of the components illustrated in FIG. 2. In addition, it will be readily understood by those of ordinary skill in the art that the mutual positions of the components is changed corresponding to the performance or structure of the system.

Each component illustrated in FIG. 2 refers to software and/or hardware component such as a field programmable gate array (FPGA) and an application specific integrated circuit (ASIC).

Figure 4:
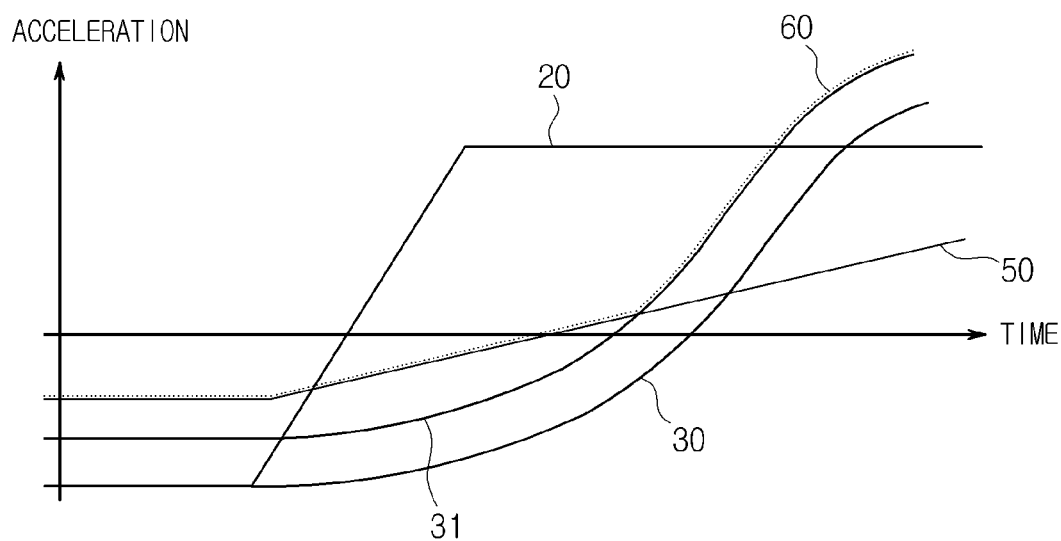
FIG. 4 is a diagram illustrating an operation of deriving a first acceleration value and a second acceleration value based on an acceleration performance of the vehicle according to an embodiment.
Figure 5:
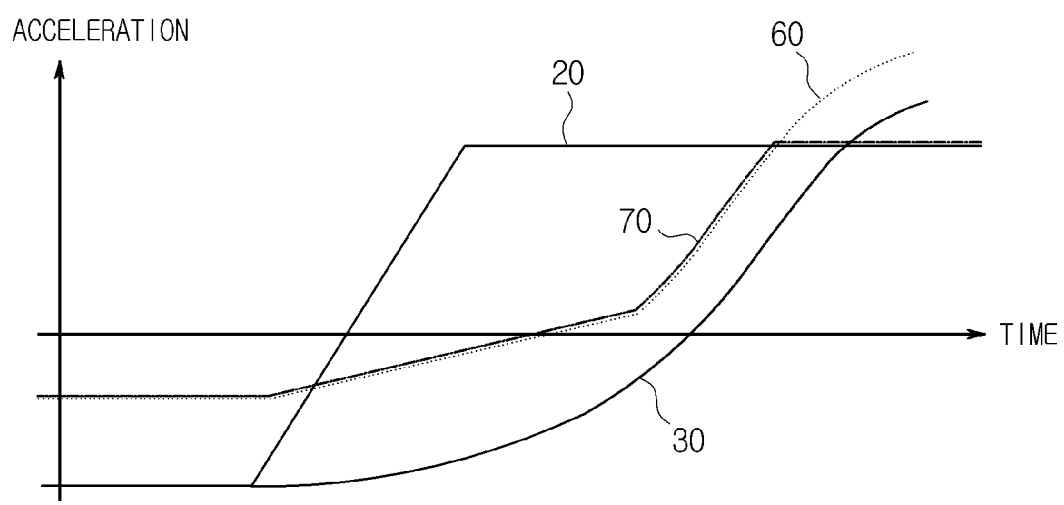
FIG. 5 is a diagram illustrating an operation of determining a final target acceleration value according to an embodiment.

FIG. 4 is a diagram illustrating an operation of deriving a first acceleration value 31 based on the acceleration performance of the vehicle according to an embodiment and deriving a second acceleration value 60 using a predetermined limit value 50 and the first acceleration value 31. FIG. 5 is a diagram illustrating an operation of determining the final target acceleration value 70 according to an embodiment.

Referring to FIGS. 4 and 5, the first acceleration value 31 in which a weight is added to an acceleration value 30 of the vehicle 1 may be derived based on the acceleration performance of the vehicle 1. Deriving the first acceleration value 31 based on the acceleration performance may mean that the same weight is added regardless of the acceleration value 30 of the vehicle 1, but the first acceleration value 31 is derived differently. For example, assuming that the current accelerations of the vehicle are 0 m/s$^2$ and 1 m/s$^2$, respectively, the first acceleration values 31 weighted by 0.2 m/s$^2$ may be 0.2 m/s$^2$ and 1.2 m/s$^2$. The acceleration performance of the vehicle 1 may be determined by determining the current acceleration in consideration of a loading state of the vehicle 1, the performance and state of the vehicle 1, and the like.

The controller 200 may derive the first acceleration value 31 close to the target acceleration value by reflecting the error rate in the acceleration value 30 of the vehicle and adding a weight to the current acceleration of the vehicle. The controller 200 may compare the predetermined limit value 50 with the first acceleration value 31 and determine the larger of the two values as the second acceleration value 60. The reason for determining the predetermined limit value 50 is that the acceleration of the vehicle 1 may need to be increased to a certain acceleration for a certain period of time. For example, when the vehicle 1 needs to increase the speed in a short time, the vehicle 1 may need to rapidly increase the acceleration for a certain period of time. At this time, even if the first acceleration value 31 is derived by reflecting the error rate due to a poor acceleration performance of the vehicle 1, the vehicle 1 may not reach the required acceleration value within a required time. In order to prevent this situation, it may be necessary to set the predetermined limit value 50 above a certain value. The predetermined limit value 50 may be set to reach a certain acceleration for a certain time. When the first acceleration value 31 is smaller than the predetermined limit value 50, the controller 200 determines the predetermined limit value 50 as the second acceleration value 60 and controls the vehicle 1 to reach the certain acceleration for the certain time. When the second acceleration value 60 is determined, the controller 200 finally compares the target acceleration value 20 with the second acceleration value 60 and determines the smaller value as the final target acceleration value 70.

Even if the controller 200 derives the target acceleration value 20 by limiting the acceleration change rate to the basic target acceleration value 10 of the vehicle 1 and controls the vehicle according to the same target acceleration value 20 in the same vehicle, an acceleration state of the vehicle may be varied depending on whether the vehicle is loaded with a load or whether the vehicle is on an uphill road. The final target acceleration value 70 may be derived in the same way as in FIG. 5, and because the acceleration value 30 of a vehicle with a poor performance has the larger target acceleration value 20 and a larger error rate than an acceleration value 40 of a vehicle with a good performance, a problem such as overshooting may occur when the acceleration is increased by the target acceleration value 20 within a short time, but the problem such as overshooting may be prevented by deriving the final target acceleration value as described above.

Figure 6:
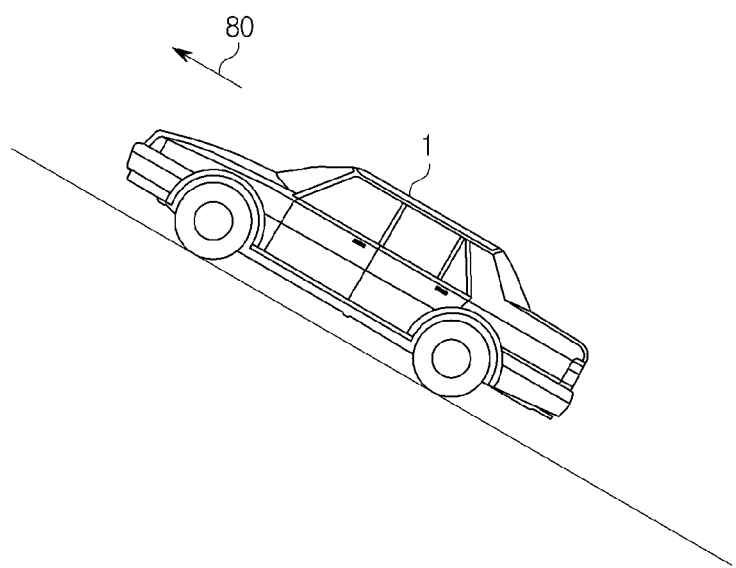
FIG. 6 is a diagram illustrating an operation of determining the final target acceleration value when the vehicle is on an uphill road according to an embodiment.

FIG. 6 is a diagram illustrating an operation of determining the final target acceleration value when the vehicle is on an uphill road according to an embodiment.

Referring to FIG. 6, when the vehicle 1 is on an uphill road 80, the predetermined limit value may be determined to be larger than a first predetermined output limit value.

The first predetermined output limit value may refer to a minimum force required to reach a desired acceleration for a certain time when the vehicle 1 is on a flat ground.

That is, in a case where the controller 200 controls the acceleration in response to the first predetermined output limit value when the vehicle 1 is on the uphill road 80, the vehicle 1 is subjected to more gravitational acceleration due to gravity than when the vehicle 1 is on a flat road, so that it may take more time to reach the desired acceleration. For example, in the case of the uphill road 80, in order for the vehicle 1 to travel at a constant speed under gravity, a desired target may be achieved only by changing the acceleration to a value larger than the first predetermined output limit value.

Figure 7:
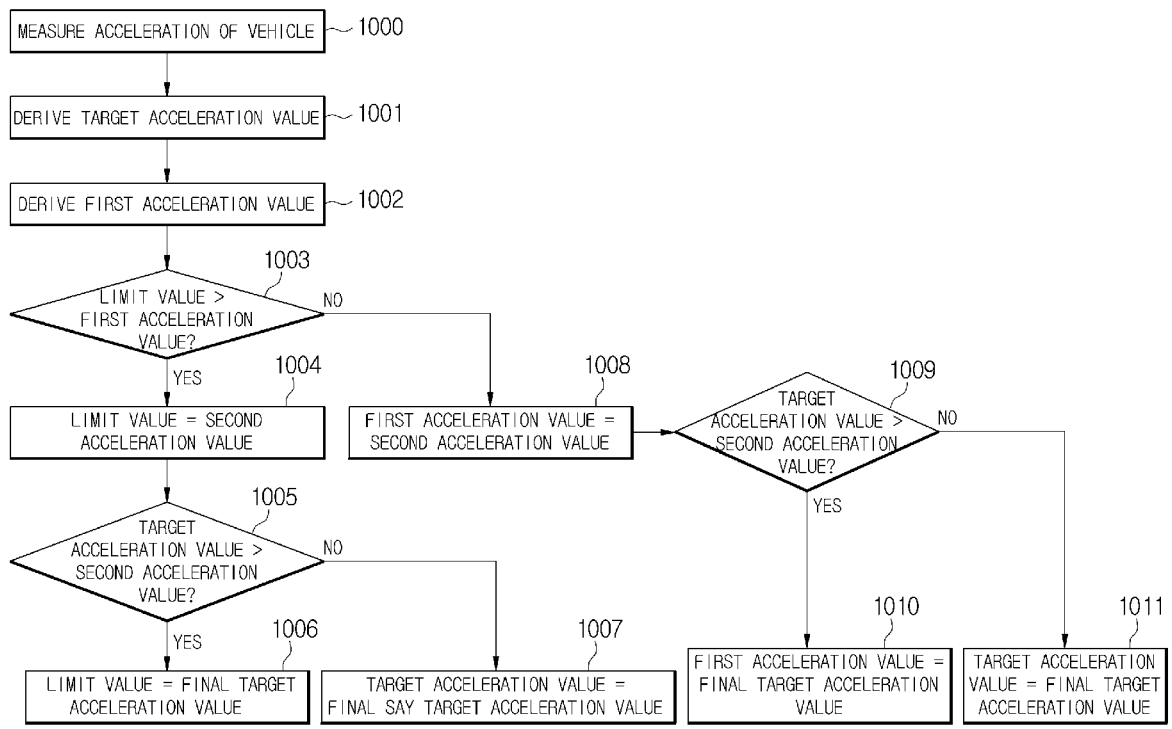
FIG. 7 is a flowchart illustrating an operation of determining the final target acceleration value according to an embodiment.

FIG. 7 is a flowchart illustrating an operation of determining the final target acceleration value according to an embodiment. Referring to FIG. 7, the sensor unit measures an acceleration of the vehicle (1000). After the acceleration of the vehicle is measured, the controller 200 derives the target acceleration value (1001). After deriving the target acceleration value, the controller 200 derives the first acceleration value (1002). The first acceleration value is derived by adding a weight to the acceleration of the vehicle measured based on the acceleration performance of the vehicle. After deriving the first acceleration value, the controller 200 compares the first acceleration value with the predetermined limit value (1003).

The controller 200 compares the predetermined limit value and the first acceleration value (1003), and determines the larger value as the second acceleration value. When the predetermined limit value is larger than the first acceleration value (YES at 1003), the predetermined limit value becomes the second acceleration value (1004). The target acceleration value and the second acceleration value are compared (1005), and when the target acceleration value is larger than the second acceleration value (YES at 1005), the final target acceleration value becomes the predetermined limit value (1006), and when the target acceleration value is not larger than the second acceleration value (NO at 1005), the final target acceleration value becomes the target acceleration value (1007).

When the predetermined limit value is not larger than the first acceleration value (NO at 1003), the first acceleration value becomes the second acceleration value (1008). The target acceleration value and the second acceleration value are compared (1009), and when the target acceleration value is larger than the second acceleration value (YES at 1009), the final target acceleration value becomes the first acceleration value (1010), and when the target acceleration value is not larger than the second acceleration value (NO at 1009), the final target acceleration value becomes the target acceleration value (1011).

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, according to embodiments of the disclosure, a vehicle and a control method thereof can derive a final target acceleration value in consideration of a surrounding environment of the vehicle and an acceleration performance of the vehicle.

The embodiments disclosed with reference to the accompanying drawings have been described above. However, it will be understood by those skilled in the art that various changes in form and details may be made therein without departing from the spirit and scope of the disclosure as defined by the appended claims. The disclosed embodiments are illustrative and should not be construed as limiting.

What is claimed is:
1. A vehicle comprising:
a sensor configured to measure a current acceleration of the vehicle; and
a controller configured to:
derive a target acceleration value based on a surrounding environment of the vehicle;

derive a first acceleration value based on an acceleration performance of the vehicle;
determine a second acceleration value based on a predetermined limit value and the first acceleration value;
determine a final target acceleration value based on the target acceleration value and the second acceleration value; and
control the current acceleration of the vehicle to be changed based on the final target acceleration value, wherein:
when the current acceleration of the vehicle is less than or equal to zero, a first rate of change of the current acceleration of the vehicle based on the final target acceleration value is used,
when the current acceleration of the vehicle is greater than zero, a second rate of change of the current acceleration of the vehicle based on the final target acceleration value is used, and
the second rate of change is smaller than the first rate of change.

2. The vehicle according to claim 1, wherein the surrounding environment of the vehicle comprises a distance between the vehicle and an object in front of the vehicle or a relative speed between the vehicle and the object in front of the vehicle.

3. The vehicle according to claim 1, wherein the controller is configured to derive the first acceleration value by adding a predetermined weight to the current acceleration of the vehicle based on the acceleration performance of the vehicle.

4. The vehicle according to claim 3, wherein the controller is configured to compare the predetermined limit value with the first acceleration value and determine the larger of the two values as the second acceleration value.

5. The vehicle according to claim 3, wherein the controller is configured to compare the target acceleration value with the second acceleration value and determine the smaller of the two values as the final target acceleration value.

6. The vehicle according to claim 3, wherein the controller is configured to determine the predetermined limit value to be larger than a first predetermined output limit value when the vehicle is on an uphill road,
wherein the first predetermined output limit value is a minimum force required to reach a desired acceleration for a certain time when the vehicle is on a flat ground.

7. A control method of a vehicle, the control method comprising:
measuring a current acceleration of the vehicle;
deriving a target acceleration value based on a surrounding environment of the vehicle;
deriving a first acceleration value based on an acceleration performance of the vehicle;
determining a second acceleration value based on a predetermined limit value and the first acceleration value;
determining a final target acceleration value based on the target acceleration value and the second acceleration value; and
controlling the current acceleration of the vehicle to be changed based on the final target acceleration value, wherein:
when the current acceleration of the vehicle is less than or equal to zero, a first rate of change of the current acceleration of the vehicle based on the final target acceleration value is used,
when the current acceleration of the vehicle is greater than zero, a second rate of change of the current acceleration of the vehicle based on the final target acceleration value is used, and
the second rate of change is smaller than the first rate of change.

8. The control method according to claim 7, wherein the surrounding environment of the vehicle comprises a distance between the vehicle and an object in front of the vehicle or a relative speed between the vehicle and the object in front of the vehicle.

9. The control method according to claim 7, wherein deriving the first acceleration value comprises deriving the first acceleration value by adding a predetermined weight to the current acceleration of the vehicle based on the acceleration performance of the vehicle.

10. The control method according to claim 9, wherein determining the second acceleration value comprises comparing the predetermined limit value with the first acceleration value and determining the larger of the two values as the second acceleration value.

11. The control method according to claim 10, wherein determining the final target acceleration value comprises comparing the target acceleration value with the second acceleration value and determining the smaller of the two values as the final target acceleration value.

12. The control method according to claim 10, wherein determining the predetermined limit value comprises determining the predetermined limit value to be larger than a first predetermined output limit value when the vehicle is on an uphill road,
wherein the first predetermined output limit value is a minimum force required to reach a desired acceleration for a certain time when the vehicle is on a flat ground.

13. A system for controlling acceleration of a vehicle, the system comprising:
a sensor coupled to the vehicle and configured to measure a current acceleration of the vehicle; and
a controller configured to:
derive a target acceleration value based on a surrounding environment of the vehicle;
derive a first acceleration value based on an acceleration performance of the vehicle;
determine a second acceleration value based on a predetermined limit value and the first acceleration value;
determine a final target acceleration value based on the target acceleration value and the second acceleration value; and
control the current acceleration of the vehicle to be changed based on the final target acceleration value, wherein:
when the current acceleration of the vehicle is less than or equal to zero, a first rate of change of the current acceleration of the vehicle based on the final target acceleration value is used,
when the current acceleration of the vehicle is greater than zero, a second rate of change of the current acceleration of the vehicle based on the final target acceleration value is used, and
the second rate of change is smaller than the first rate of change.

14. The system according to claim 13, wherein the sensor comprises a camera, a radar, a Lidar, or a speed sensor.

15. The system according to claim 13, wherein the surrounding environment of the vehicle comprises a distance between the vehicle and an object in front of the vehicle or a relative speed between the vehicle and the object in front of the vehicle.

16. The system according to claim 13, wherein the controller is configured to derive the first acceleration value by adding a predetermined weight to the current acceleration of the vehicle based on the acceleration performance of the vehicle.

17. The system according to claim 16, wherein the controller is configured to compare the predetermined limit value with the first acceleration value and determine the larger of the two values as the second acceleration value.

18. The system according to claim 16, wherein the controller is configured to compare the target acceleration value with the second acceleration value and determine the smaller of the two values as the final target acceleration value.

19. The system according to claim 16, wherein the controller is configured to determine the predetermined limit value to be larger than a first predetermined output limit value when the vehicle is on an uphill road,
   wherein the first predetermined output limit value is a minimum force required to reach a desired acceleration for a certain time when the vehicle is on a flat ground.

* * * * *